UNITED STATES PATENT OFFICE.

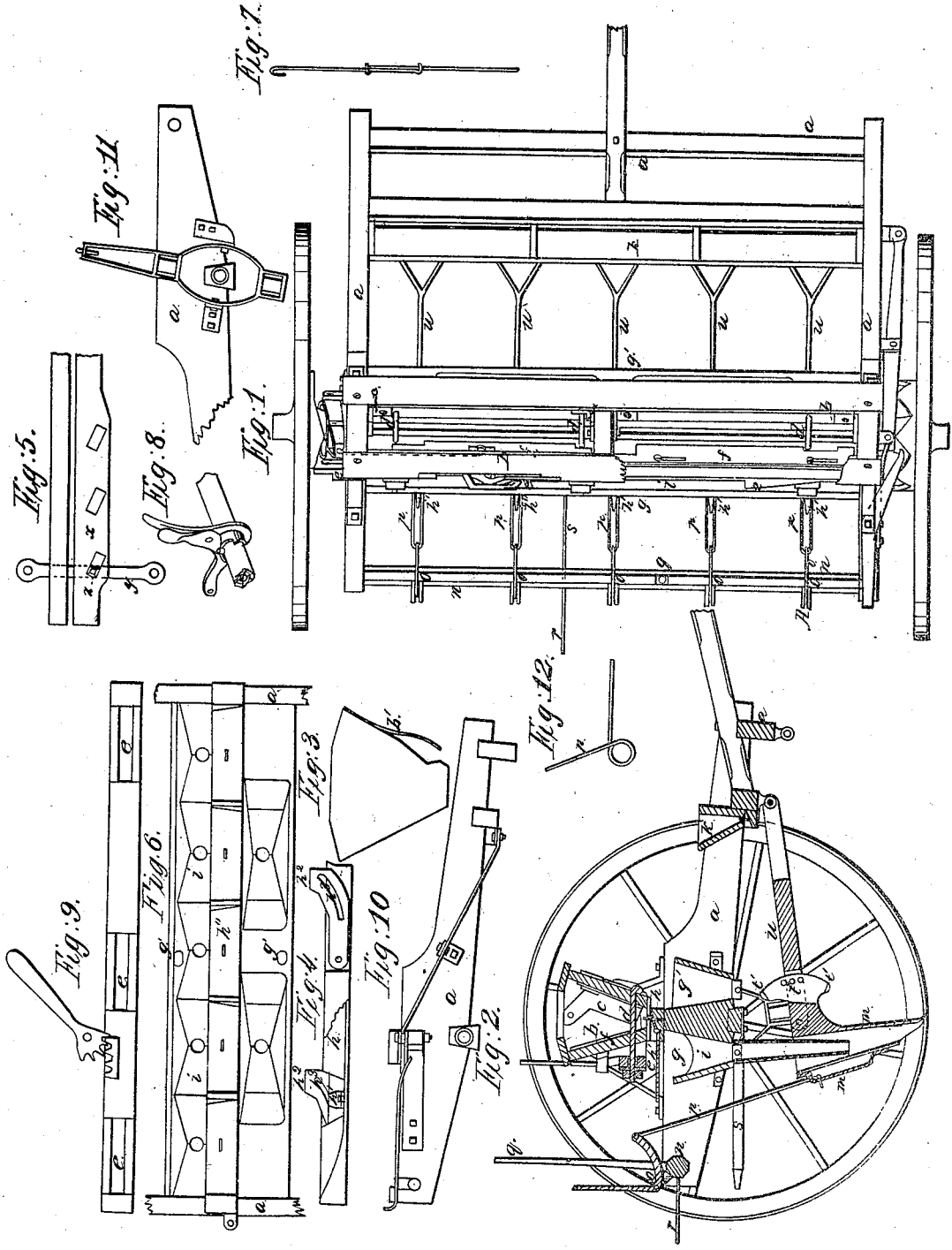

P. SEYMOUR, OF EAST BLOOMFIELD, NEW YORK.

IMPROVEMENT IN SEED-PLANTERS.

Specification forming part of Letters Patent No. 13,326, dated July 24, 1855.

*To all whom it may concern:*

Be it known that I, P. SEYMOUR, of East Bloomfield, in the county of Ontario and State of New York, have invented certain new and useful Improvements in Seed-Drills; and I do hereby declare that the following is a full, clear, and exact description of the principle or character which distinguishes them from all other things before known, and of the usual manner of making, modifying, and using the same.

The nature of my improvements consists in the mode of regulating the delivery of the seed from the seed-box with the appurtenances therefor, and the double or additional seed-box for sowing broadcast while drilling.

I first form an oblong frame, $a$, which I mount on two wheels and furnish with a pole. Upon this frame, in proper position, near the center, I place the seed-box $b$, extending from side to side. One side of this box is stationary, and the other side, or the lower portion thereof, at least, is movable to or from the stationary part. The two ends of the seed-box and the partitions therein are attached firmly to the stationary side thereof on one side, while on the other they are furnished each with a spring, (see $b'$, Fig. 3,) shown in the separate partition. The movable part of the box is thus forced off from the other, so as to open a space the whole length of the bottom. This movable portion of the seed-box is jointed or attached to the ends of the seed-box and partitions by the angle-irons or plates $c$, which extend down, covering the springs above named, and prevent clogging; and also to maintain the side at a proper level and not to let it fall as it opens. A series of bolts, $d$, pass through the two sides, being affixed to the moving side on the stationary side. These bolts are connected with a series of wedges, $e$, connected together and sliding endwise, so as to open or close the seed-box at the will of the operator to any desired degree to regulate the delivery of seed. If neither side of the seed-box is made movable, the bar $x$ (shown at Fig. 5) may be employed. It is supported in place by the supporter $y$ and a stud, $z$, on which enters the inclined groove in the plate or bar $x$, by which it is made to open or close by moving endwise.

On the inside of the stationary part of the seed-box there is a flat plate, $f$, which has a motion endwise, that serves to shake down the seed, which in some cases, when damp, &c., may otherwise clog.

Just below the opening in the seed-box there is a bar, $h$, upon which are a series of thin metal plates, $h^2$, jointed, which I denominate "grain-teeth," $h^2$. (Shown detached in Fig. 4.) The teeth are raised and lowered by levers, $h,'$ that enter inclined slots $h^3$, so that by the sidewise movement of said levers the teeth are moved each one by its separate levers, so as to be thrust up into the box or lowered out of it to stop feeding at that point.

I find no mode of delivering the seed from the box equal to a long narrow opening, which is the simplest of all; but for drilling it is necessary to gather the seed thus delivered into the tubular teeth. To effect this I employ a trough, $g$, below, with planes inclining toward the tubes, as shown at $i$. The vibrating bar $h$ directs the seeds into this trough, whence they descend into the ground through the seed-teeth. One trough of this kind is placed at the point $g$, a little behind the seed-box, and another similar one, $g'$, is fixed in front of it. Their purposes are as follows: When all the seed-teeth are placed in a row the rear gatherer supplies them; but if half of them are placed forward they are fed from the forward gatherer, $g'$. The reason for the double position of the teeth is this. In fine soil, or, in fact, generally in any soil, it is better for all the teeth to be in a row to prevent the seed from being badly and unevenly covered; but sometimes, when large clods, stones, &c., are prevalent, the other mode should be resorted to, and it is highly desirable to have the implement to shift.

When using the two gathering-troughs the vibrating bar $h''$ must be used, (shown in Fig. 6,) which distributes the seeds, half to either side, by the direction of the inclines thereon.

The grain-teeth bar $h$, the vibrating plate $f$, and other moving parts are worked by a zigzag or crown cam on the hub of the wheel in the ordinary way of vibrating parts of seed-planters.

At the front of the frame there is a seed-box, $k$, which may be used for sowing broadcast. This I add, as it has sometimes been found desirable to sow broadcast, and at the same time drill. When I sow broadcast alone I remove the gatherers and tubular teeth $m$, and the machine is a simple broadcast-seeder.

The apparatus for raising the teeth $m$ is so constructed as to raise one or all of them, and consists of a windlass, $n$, on which is affixed a series of bent levers, $o$, to one arm of which there is a connecting-hook, $p$, that extends down and is hitched into a long staple, $m'$, on the tooth, so that the tooth has room to slide up and down when it meets uneven ground or obstacles, notwithstanding the stiff hook $p$ in place of the usual chain, which latter I dispense with, as it is subject to be tangled and interrupt the proper operation of the tooth.

As a substitute for the long staple $m'$, I sometimes cause one portion of the hook $p$ to slide upon the other. (See Fig. 7.) To raise one tooth at a time the upper arm of the bent lever $o$ is drawn back, raising the other till its end passes a line drawn from the two points of attachment of the hook $p$ at the tooth and lever, by means of which the seed-tooth is held up in place; but when all the teeth are to be raised the arm $q$, attached to the windlass, is drawn back, turning the windlass about a quarter of a revolution, till the arm $r$ engages with a spring-catch, $s$, and is held in that position.

As a modification of the bent levers $o$, I sometimes employ the lever shown in Fig. 8. The teeth I attach to the beams or drag-bars, as shown in Fig. 2. The tooth $m$ has a broad flat projection, $t$, on its front side, that has an enlargement, $t'$, at the top and bottom, which limits its range of motion. It is attached to the drag-bar $u$ at the point shown in the drawings, and has several holes, $t^2$, to regulate its pitch by passing a wooden pin through one of them above the drag-bar.

The operation is this: Should the apparatus be backed while the teeth are down, the lower ends of them are pushed forward till the lower projection $t'$ strikes the drag-bar, at which point they will slide backward without injury, and in drawing forward, should the wooden pin holding the tooth at the proper pitch break, it will fall backward till the upper projection $t'$ strikes the bar above, at which point it is sufficiently inclined to be drawn out, but will still drop seed regularly till put in place again.

Having thus fully described my improvements in drills, what I claim therein as new, and desire to secure by Letters Patent, is—

1. The combination of the movable side of the seed-box with angular hangings $c$, spring $b'$, Fig. 3, and inclined plains or wedges $e$, or their equivalents, for the purpose of opening and closing said box, and thus to regulate the quantity of seed or substance to be delivered.

2. The slide plate $f$, to prevent the seed from clogging, as described.

3. Combination of the angular levers $o$, having their fulcrum on inclined standards or its equivalent, with the rods $p$, linking them to the drill-tube $m$ in the manner and for the purposes set forth.

PIERPONT SEYMOUR.

Witnesses:
ISAAC N. MITCHELL,
BARTON B. WOOD.